Sept 10, 1957 C. L. MADDEN 2,805,868
INDEPENDENT WHEEL MOUNTING ASSEMBLY FOR VEHICLES
Filed July 28, 1954 2 Sheets-Sheet 1
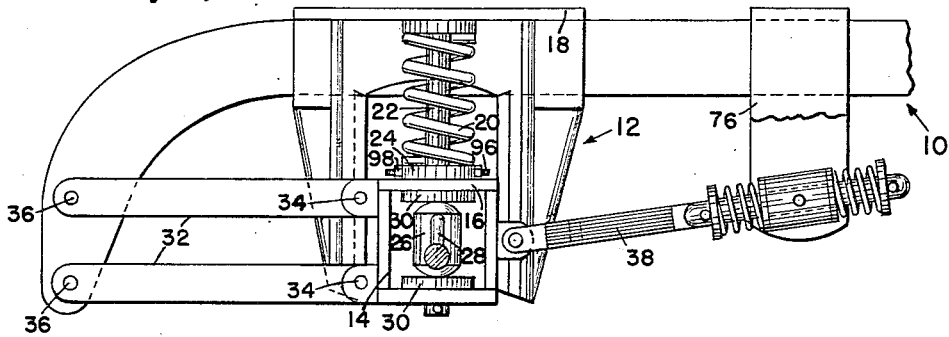
FIG. 1
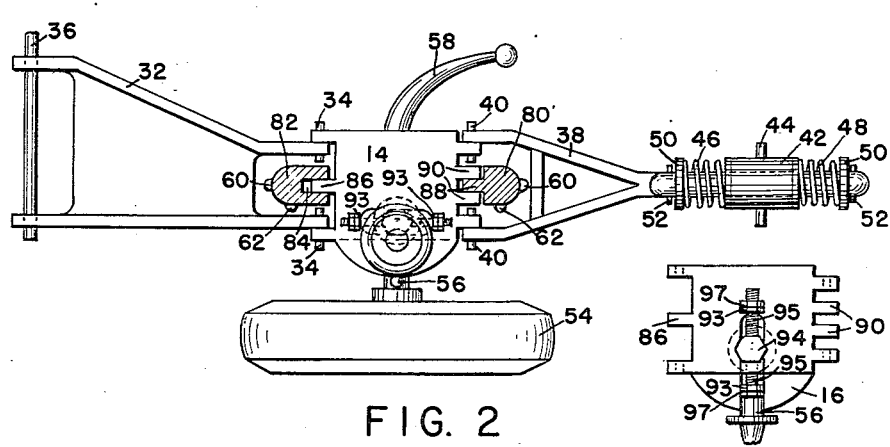
FIG. 2
FIG. 3
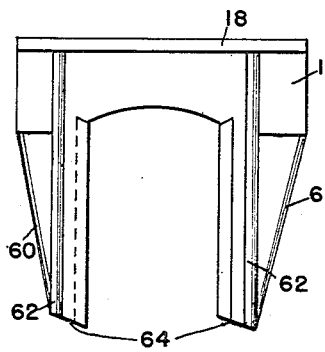
FIG. 4
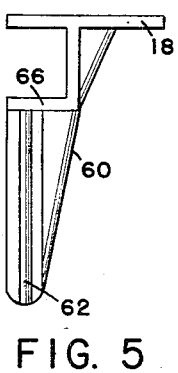
FIG. 5
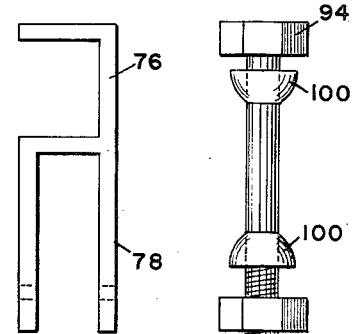
FIG. 6
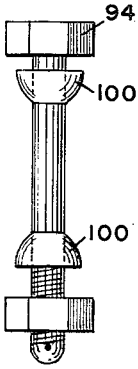
FIG. 7
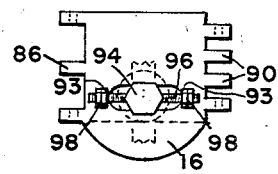
FIG. 8
*INVENTOR.*
CHARLES L. MADDEN
BY H. F. Woodward
atty Sept 10, 1957     C. L. MADDEN     2,805,868
INDEPENDENT WHEEL MOUNTING ASSEMBLY FOR VEHICLES
Filed July 28, 1954     2 Sheets-Sheet 2

INVENTOR.
CHARLES L. MADDEN
BY H. F. Woodward
atty

United States Patent Office 2,805,868
Patented Sept. 10, 1957

2,805,868

INDEPENDENT WHEEL MOUNTING ASSEMBLY FOR VEHICLES

Charles L. Madden, Minneapolis, Minn.

Application July 28, 1954, Serial No. 446,227

4 Claims. (Cl. 280—124)

This invention relates to vehicle suspension mechanism.

The principal object of the present invention is to provide a cushioning suspension for wheeled land vehicles which will be more efficient in operation than the present day types in use and also a suspension in which the movement is fore and aft and up and down thus reducing tire wear and eliminating tire wipe.

A further object is to provide a suspension of this nature which is compact and economical to manufacture.

Other and further objects of the invention and the advantages of the same will be pointed out hereinafter and indicated in the appended claims or will be obvious to one skilled in the art upon understanding of the present disclosure.

For the purpose of this application there has been elected to set forth one particular structure and certain modifications thereof, but it is to be understood that they are here presented for illustrative purposes only and are not to be accorded any interpretation such as might have the effect of limiting what is claimed as the invention short of its true and comprehensive scope in the art.

Referring to the drawings in detail,

Figure 1 is a side elevational view of the wheel suspension;

Figure 2 is a top plan view of the same;

Figure 3 is a bottom plan view of the same with parts broken away;

Figure 4 is a side view of the suspension frame bracket adaptably secured to the frame and support the wheel suspension;

Figure 5 is a side view of the bracket shown in Figure 4;

Figure 6 is a view of the bracket employed to support the rear torque arm;

Figure 7 is a view of the king pin provided with half rounded washers;

Figure 8 is a top plan view with portions broken away of the axle suspension box showing king pin adjustment means;

Figure 9:
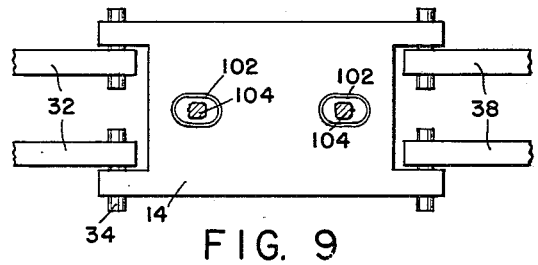
Figure 9 is a top plan view of the axle box provided with internal guides.

Referring to the drawings in detail 10 indicates a frame of a wheeled land vehicle, it should be understood that the arrangement shown in the drawings can be applied to steering wheel suspension, drive wheel suspension, and to wheel suspension on push and/or pull types vehicle. Stated in another way the arrangement may be applied to a steering axle, to a solid axle and a rotary axle. The axle box guide is indicated generally as 12. This bracket is suitably mounted on the frame and the top member 18 and the bottom member 66 forming an opening which fits over the frame. The depending leg 80 of the frame 12 is provided with a tongue or male member 88 which cooperates with the tongues 90 of the axle box. The other leg 82 of the frame 12 is provided with groove 84 which cooperates with the tongue 86 of the axle box 12. The box 14 is free to move up and down vertically in a substantially straight line in the frame 12. The frame may be provided with ribs 60 and 62 for giving added strength, but it is to be understood that the ribs may be omitted where the added strength is not needed. The tongues 86 and 88 are slide fits on the sides and are loose fits on the ends.

The axle box 14 is provided with shelf member 16 which supports the spring 20 which is held in place by suitable member 24 upon shelf 16 and the outer projection of member 18. It is generally desirable to incorporate a hydraulic means 22 within the spring. Such hydraulic means may be a direct acting conventional shock absorber 22 of the telescoping type. The location of the cushioning means adjacent the wheel as shown in Figure 2 provides greater width than ordinary and thus assures greater stability. The hydraulic means may be positioned on the box outside of the spring. The hydraulic means could be located inside the frame if desired, and attached to the vehicle at various angles.

The axle box 14 is provided with ear-like members on opposite sides. To these ears are attached the torque arms. The front torque arms are attached to the ears by pin-like member 34 and to the frame by members 36. The torque arms are preferably pressed from sheet metal with web portion removed so that clearance for the axle box brackets and clearance for the frame 10 is provided. The two front torque arms 32, as shown in Figure 1, with the frame and the axle box form a parallelogram. The rear torque arm 38 is of the shape shown in Figures 1 and 2. One end of the rear torque arm is attached to the axle box 14 and the other end is hingedly mounted in arms 78 of bracket 76 by pin-like members 44. The pins 44 extend from opposed sides of cylindrical member 42. The free end of the rear torque arm extends through member 42. Springs 46 and 48 are mounted around the end of the torque arm. These springs are confined between the ends of the cylindrical member 42 and washer-like members 50. The members are held in place by pins 52 which pass through the torque arm. The torque arm is supported by the vehicle frame by the bracket 76 which is suitably connected to the frame. The axle box 14 is provided on one side with a pair of lugs or arms adjacent the top of the box and a second pair of arms are provided adjacent the lower edge of the box.

The axle box 14, which is permitted to move up and down in the axle box frame 12, has openings through which the king pin passes. The box may have the opening bushed and at such an angle to give permanently the proper caster and camber. It is preferred that the king pin be adjustable and for adjusting the position of the top of the king pin, threaded members 96, passing through threaded ear members 93 and adjustable lock nuts 98, are provided. This arrangement is clearly shown in Figure 8. For tilting outwardly of the wheel means shown in Figure 3, there is provided easy adjustable means, this includes threaded members 95 and lock nuts 97 and threaded ears 93. The adjustment of the king pin controls the caster and camber in wheel alignment. When the king pin is adjusted shims should be used between the box and the bearing 30.

Caster is the annular tilt of the top of the king pin as compared to a true vertical position measured where the central line of the wheel spindle intersects the central line of the king pin.

Camber is the outward tilt of the front wheel at the top.

In the axle box 14 is mounted spindle 26 which may be provided with rib 28. The spindle is provided with half round ends which ride upon the bearings 30. This arrangement with sweep type steering arms 58 assures easier steering and eliminates the necessity for power steering. Also this arrangement provides that the king pin is centered with the line of force. The vehicle wheel 54 is mounted on the member 56 in the usual manner. The king pin 94 is provided with semi-spherical washers 100 which are important to the easy adjustability of camber and caster.

In the modified form shown in Figure 9, the axle box 14 is the same as in Figure 1 but the slides or arms of the axle guides are arranged to pass through the box. The sides of the guides or slides 104 are in slide contact with the sides of the lining 102 mounted in the openings in the axle box. The slides are loose fit at the ends.

Figure 10:
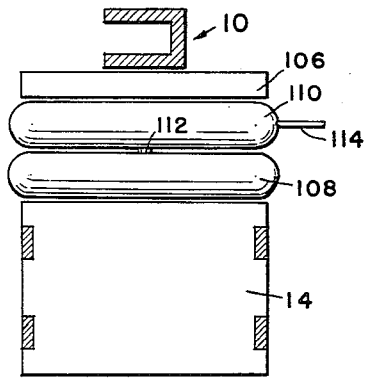
Figure 10 is a side view of the axle box showing the use of air cushions in place of the spring as a cushioning means.

In Figure 10 the axle box 14 is the same as in Figure 1 but there is substituted an air cushion for the spring 20. A plate 106 extends out beyond the edge of the frame 10 and is positioned on the top of the air cushion. The air cushion shown consists of two chambers 108 and 110 connected by passage 112. The air is supplied to the chambers from a source (not shown) through conduit 114.

Figure 11:
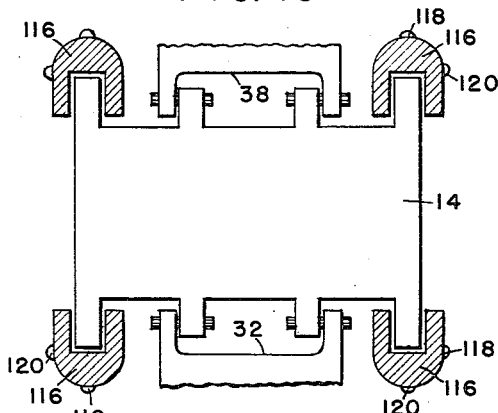
Figure 11 is a top plan view of an axle box in which multiple guides are used.
Figure 12:
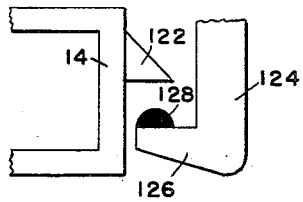
Figure 12 is a view with parts broken away of an axle box in which the rear torque arm is not employed and a stop is provided.

In Figure 11 the axle box is the same as shown in Figure 1. The axle guides 116 are arranged at the corners of the box 14 and the torque arms 32 and 38 are positioned between the corner brackets. The guides 116 may be provided with reinforcing ribs 118 and 120.

In some wheel suspensions the rear torque arm may be omitted and in such arrangement a stop member 122 is secured to the box side, an arm 124 is attached to the vehicle frame. The arm 124 has a substantially right angle extension 126 upon which is mounted a rubber stop 128. It is to be understood that the new arrangement can be applied to those vehicles in which the frame and body are built as a unit.

The cushioning means may be a coil spring, leaf spring, air spring, cushioning pads or equivalent with or without hydraulic shock absorber.

The arrangement provides longer tire life and no tire wipe with the tire wear being in the line of rotation. There is no binding on the slides as the forces presented by the roadshocks are balanced. The axle supporting means in Figures 2 and 9 shows the box 14 to be loosely mounted in the brackets. This arrangement provides for free upward and downward movements of the axle box and, expressed in another way, provides for lost motion relationship between the guide means and the wheel box.

What is claimed:

1. A resilient support for a vehicle body comprising spaced guides attached to the body and extending downwardly therefrom, an axle box having sides and a top and slidable and loosely mounted in the guides for upward and downward movements, pairs of torque arms pivotally attached to a side of the axle box at one end and at the other end pivotally attached to the vehicle frame, said torque arms arranged one above the other so that they with the axle box and vehicle frame form a parallelogram, and a torque arm pivotally attached to the axle box at one end and at the other end it is slidably attached to a sleeve member, said sleeve member being pivotally attached to the vehicle frame.

2. A wheel suspension for a vehicle comprising substantially parallel guides attached to a vehicle frame and depending therefrom, an axle box having sides and a top and movably and loosely mounted in the guides for free vertical upward and downward movements without binding between said guides and said box, an axle operatively mounted in the axle box, two pair of torque arms, one pair mounted above the other pair, said torque arms pivotally attached at one end to the vehicle frame and at the other end pivotally attached to one side of the axle box, cushioning means including a spring mounted between the top of the axle box and the guide brackets and a torque arm pivotally attached to the other side of the axle box at one end and yieldably attached at the other end to means pivotally connected to the frame, said latter means pivotally attached to the frame.

3. A wheel suspension for a vehicle frame including an axle supporting member; an axle operatively supported by the said axle member; a pair of torque arms pivotally attached at one end to a side of the axle supporting member and pivotally attached at the other end to the vehicle frame, said pair of torque arms arranged one above the other; a sleeve-like member; a third torque arm pivotally attached to the said axle supporting member at one end and the other end of said third torque arm slidably attached to said sleeve-like member; said sleeve-like member pivotally attached to the vehicle frame, and cushioning means positioned between the axle supporting means and the vehicle frame.

4. A wheel suspension for a vehicle frame including an axle supporting member; an axle operatively supported by the said axle member; a pair of torque arms pivotally attached at one end to a side of the axle supporting member and pivotally attached at the other end to the vehicle frame, said pair of torque arms arranged one above the other; a sleeve-like member; a third torque arm pivotally attached to the said axle supporting member at one end and the other end of said third torque arm slidably attached to said sleeve-like member; said sleeve-like member pivotally attached to the vehicle frame; cushioning means on said third torque arm for resisting sliding movement of said third torque arm; and cushioning means positioned between the said axle supporting member and the vehicle frame.

References Cited in the file of this patent

UNITED STATES PATENTS

| 1,761,135 | Moon | June 3, 1930 |
| 2,062,874 | Fulton | Dec. 1, 1936 |
| 2,080,546 | Rudoni | May 18, 1937 |
| 2,112,293 | Kromm et al. | Mar. 29, 1938 |
| 2,122,476 | Leighton | July 5, 1938 |
| 2,125,511 | Martins | Aug. 2, 1938 |
| 2,507,108 | Lange | May 9, 1950 |

FOREIGN PATENTS

| 24,278 of 1929 | Australia | Dec. 20, 1929 |
| 518,848 | Germany | Feb. 20, 1931 |